(12) United States Patent
De Swert

(10) Patent No.: US 10,398,089 B2
(45) Date of Patent: Sep. 3, 2019

(54) FLORAL PACKAGING METHOD AND APPARATUS

(71) Applicant: Nico De Swert, Dallas, TX (US)

(72) Inventor: Nico De Swert, Dallas, TX (US)

(73) Assignee: NICOMODO CO., Dallas, TX (US)

( * ) Notice: Subject to any disclaimer, the term of this patent is extended or adjusted under 35 U.S.C. 154(b) by 242 days.

(21) Appl. No.: 15/356,358

(22) Filed: Nov. 18, 2016

(65) Prior Publication Data

US 2018/0139908 A1    May 24, 2018

(51) Int. Cl.
| | |
|---|---|
| *A01G 5/06* | (2006.01) |
| *B65B 5/06* | (2006.01) |
| *B65D 85/50* | (2006.01) |
| *B65D 81/38* | (2006.01) |

(52) U.S. Cl.
CPC .............. *A01G 5/06* (2013.01); *B65B 5/06* (2013.01); *B65D 81/3827* (2013.01); *B65D 85/505* (2013.01)

(58) Field of Classification Search
CPC ... A01G 5/06; A01G 5/00; A01G 5/04; A01G 9/088; A01G 13/00; B65B 5/06; B65B 5/08
See application file for complete search history.

(56) References Cited

U.S. PATENT DOCUMENTS

| | | | |
|---|---|---|---|
| 2,664,670 A | 1/1954 | Mulfor | |
| 2,721,022 A | 10/1955 | Billerbeck | |
| 3,754,642 A | 8/1973 | Stidolph | |
| 3,924,354 A | 12/1975 | Gregoire | |
| 4,170,301 A | 10/1979 | Jones et al. | |
| 4,662,107 A | 5/1987 | Van Den Kieboom | |
| 4,936,046 A | 6/1990 | Miller | |
| 4,941,572 A | 7/1990 | Harris | |
| 5,407,072 A | 4/1995 | Weder et al. | |
| 2004/0118727 A1 | 6/2004 | Pena et al. | |
| 2008/0230419 A1* | 9/2008 | Elazar-Mittelman | A01G 5/04 206/423 |
| 2009/0056210 A1 | 3/2009 | Fortner | |

FOREIGN PATENT DOCUMENTS

| | | | |
|---|---|---|---|
| EP | 2090200 A | 8/2009 | |
| EP | 2752110 A1 * | 7/2014 | ............... A01G 5/06 |
| WO | 0176354 A1 | 10/2001 | |

* cited by examiner

*Primary Examiner* — Jessica B Wong
(74) *Attorney, Agent, or Firm* — Law Office of Jeff Williams PLLC; J. Oliver Williams

(57) ABSTRACT

An apparatus and method for the protection and transportation of floral arrangements are shown. The apparatus includes a container defining a central volume. A tray is included for the suspending of a floral arrangement within the central volume. A decorative base is configured to surround a portion of the flowers. An insert is in communication with the container and configured to cradle a portion of the decorative base so as to restrict movement. The floral arrangement is tied or coupled to a portion of the tray. An optional temperature regulating device may be inserted to assist in maintaining the freshness of the floral arrangement.

9 Claims, 9 Drawing Sheets

FLORAL PACKAGING METHOD AND APPARATUS

BACKGROUND

1. Field of the Invention

The present application relates to a packaging device, and in particular to a packaging device for floral arrangements.

2. Description of Related Art

Flowers and floral arrangements are a traditional gift given to a loved one at various times throughout a year. Holidays are a primary reason for giving floral arrangements. Other situations such as condolences, weddings, funerals, encouragement, and appreciation are common as well. The floral industry is a multi-billion-dollar industry each year.

Purchasers or givers are able to send flowers to a loved one in a couple of traditional ways. First, an individual may purchase the flowers in person. No delivery is required. Second, an individual may elect to order flowers and have them delivered. Ordering is very convenient and provides some advantages. It is quick and easy and does not require the individual to take time to pick them up. Also, it allows for delivery at remote locations where a personal delivery is unrealistic.

Floral arrangements may be made from either a local florist or through a network of collective florists (i.e. ship direct). Local florists have particular quantities and arrangements in stock and may be limited in what you need. Additionally, they may elect to fill in or replace selected flowers with whatever is still in stock, resulting in the purchaser maybe not getting what was ordered.

With respect to collective networks, the process is fairly simple. An order is placed by an individual, wherein that order may either be filled by a local florist with the same noted disadvantages stated above, or may be filled and shipped from a main facility. In shipping, the flowers are tied together with wire and laid down in a box where damage can occur to the arrangement during transportation. Additionally, the flowers are subjected to the wide ambient temperature fluctuations of shipping. Once arrived, the user is required to cut free the flowers, arrange them in a desired manner, and place them in a container after cutting the stems to the desired length. Not only do conventional methods of shipping harm the flowers but also make it near impossible to ship prearranged bouquets ready for display when received.

Although strides have been made to the floral delivery business, additional shortcomings remain. A method and apparatus for the shipping of floral arrangements are needed. Additionally, a method and apparatus that permits for the increased quality and freshness of flowers is desired.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
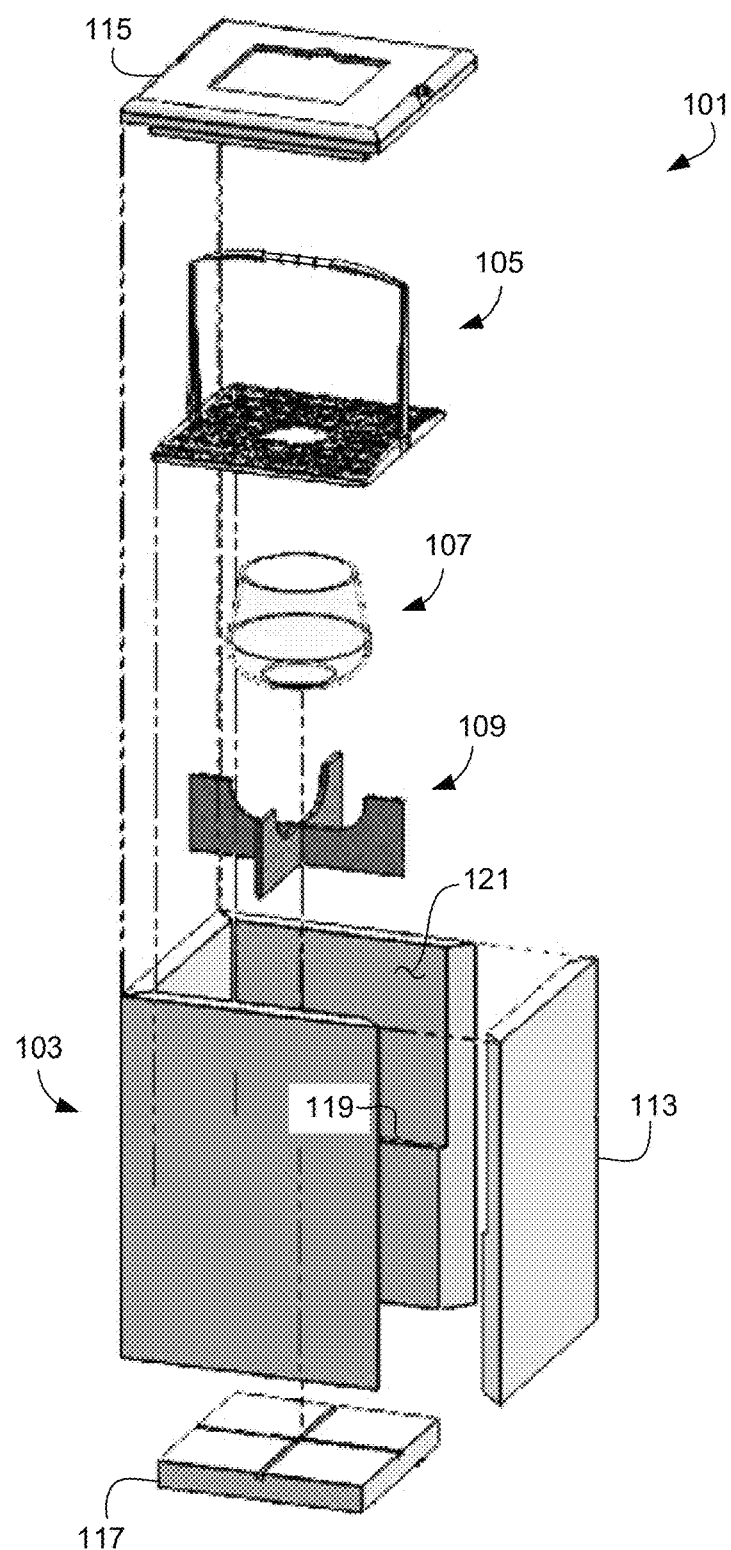
FIG. 1 is an exploded perspective view of a floral packaging apparatus according to an embodiment of the present application.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional methods and packaging practices of flowers. In particular, the device of the present application is configured to suspend a floral arrangement within a container such that the flowers are not damaged during transport. Additionally, the packaging apparatus is configured to permit for the precutting and pre-arrangement of the flowers into a desired and ready-to-go floral bouquet. The container is temperature controlled so as to maintain the freshness of the flowers during transport. A receiver of the flower arrangement is able to merely remove the flowers from the packaging as arranged and place them directly into a vase or other decorative base for display. No cutting of stems is necessary. No arranging of flowers is needed. No dismantling of hard to cut wires or bands are required. The flowers are shipped in the floral packaging apparatus in a pre-arranged and ready-to-go condition. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The apparatus and method of the present application is illustrated in the associated drawings. The packaging apparatus includes a container defining a volume for locating the floral arrangement. A tray assembly is used to suspend the flowers in a desired elevated position, such that the weight of the flower arrangement does not press against the container. A decorative base is secured within an insert beneath the flowers. The insert is in communication with the container and configured to cradle a portion of the decorative base. The tray assembly, the decorative base, and the insert are disposed within the container. Additional features and functions of the device are illustrated and discussed below.

Referring now to the drawings wherein like reference characters identify corresponding or similar elements in form and function throughout the several views. In FIG. 1 an exploded view of the floral packaging apparatus of the present application is illustrated. Floral packaging apparatus 101 includes a container 103, a tray assembly 105, a decorative base 107, and an insert 109. Container 103 is composed of a plurality of panels that define the central volume for locating the floral arrangement. Tray 105 is used to support the floral arrangement and locate it within container 103 so as to maintain a distance or space between the floral arrangement and the panels of container 103. Insert 109 is in communication with the container and configured to cradle a portion of the decorative base 107.

Figure 2:
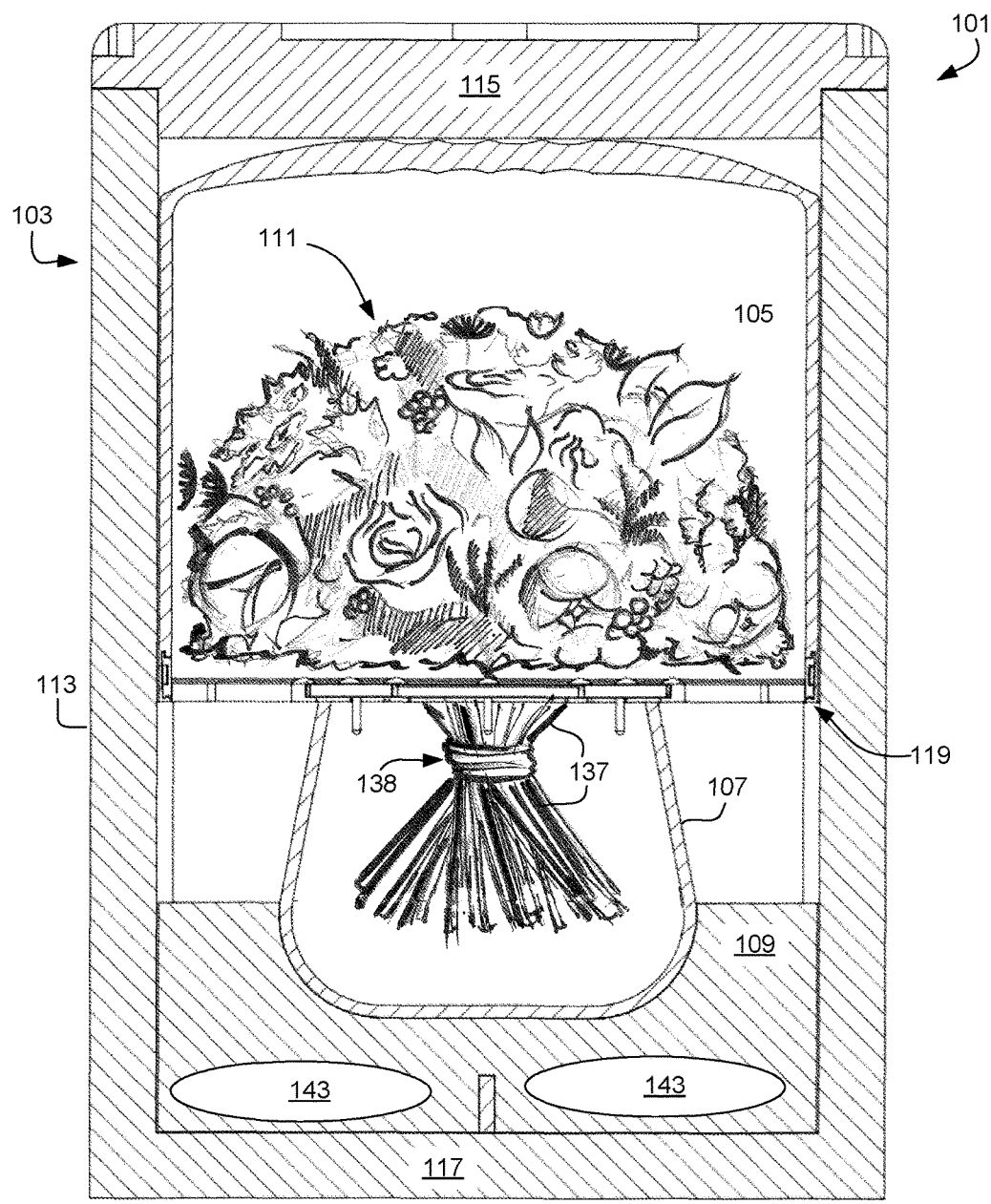
FIG. 2 is a side section view of the floral packaging apparatus of FIG. 1.

Referring now also to FIG. 2 in the drawings, a side section view of apparatus 101 is illustrated. Container 103 is configured to protect a floral arrangement 111 during transportation from receiving damage as well as to provide insulation to assist in maintaining a desired temperature. Container 103 is made from a plurality of panels 113, a lid 115, and a base 117. During transportation they are collectively sealed or closed relative to one another. A central volume within container 103 is formed between each panel 113. It is understood that panels 113 may be replaced with a single wall unit and also optionally integrally formed within base 117. This would more definitively help eliminate unwanted gaps and may be preferred over having separate panels and members. Container 103 may be made from any typical and customary materials, namely at least potentially, corrugate, plastics, composites and so forth. Insulative properties may be provided by expandable foam, resins, fiberglass materials and the like. No particular material is required.

Container 103 includes one or more grooves or ridges or ledges formed into its inner surfaces for the locating and alignment of its contents. For example, panel 113 includes a ridge 119 wherein the inner surface 121 of panel 113 is protruded out into the central volume. A plurality of ridges 119 are formed for the purpose of locating the position of tray 105. When inserted into container 103, tray 105 is lowered until it contacts with ridge 119. The location of ridge 119 is important because it placed at such a location so as to ensure that floral arrangement 111 is suspended within the central volume without resting on container 103 or decorative base 107. As seen in FIG. 2, when container 103 is closed, floral arrangement 111 is elevated at a position above decorative base 107.

Figure 3:
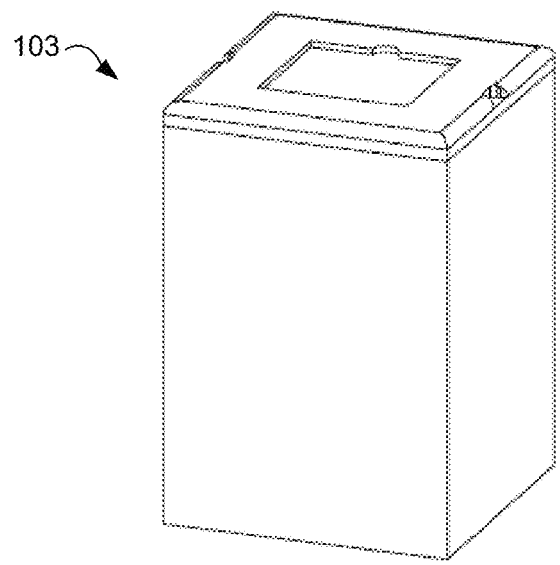
FIG. 3 is a perspective view of a container used in the floral packaging apparatus of FIG. 1.
Figure 4:
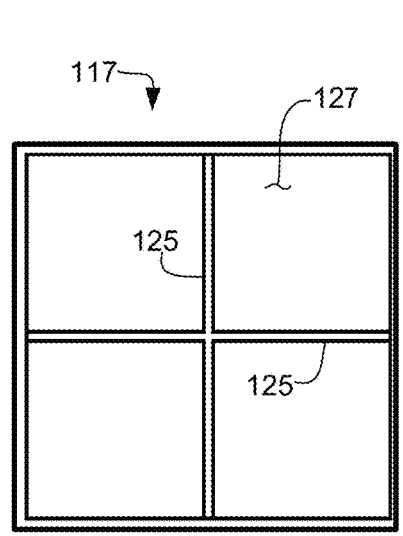
FIG. 4 is a top view of a base of the container of FIG. 3.
Figure 5:
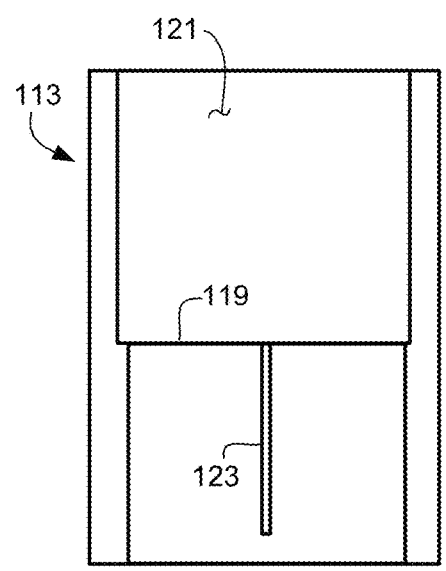
FIG. 5 is a side view of a panel of the container of FIG. 3.

Referring now also to FIGS. 3-5 in the drawings, assorted views of container 103 are illustrated. Insert 109 is configured to rest at the bottom of container 103. To properly locate and ensure a retained positioning of insert 109, panel 113 includes a vertical groove 123 for the acceptance and insertion of insert 109. Each panel 113 typically includes groove 123. Base 117 is configured to include a horizontal groove 125 along an inner surface 127. Grooves 123 and 125 are configured to accept insert 109 so that insert 109 is partially recessed within its respective surfaces 121/127. The use of grooves 123 and 125 help to ensure that insert 109 is stable during transport.

Figure 6:
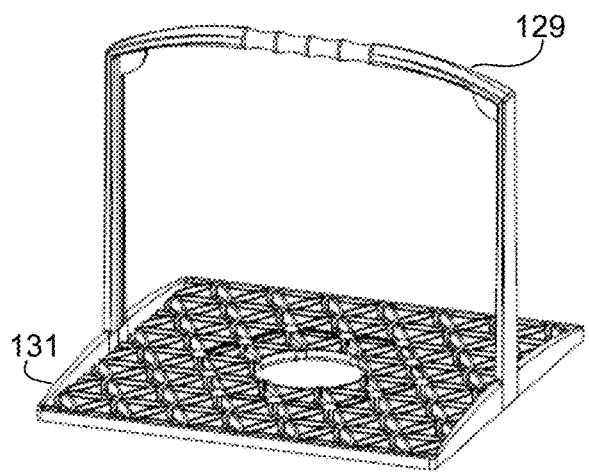
FIG. 6 is a perspective view of a tray assembly in the floral packaging apparatus of FIG. 1.
Figure 7:
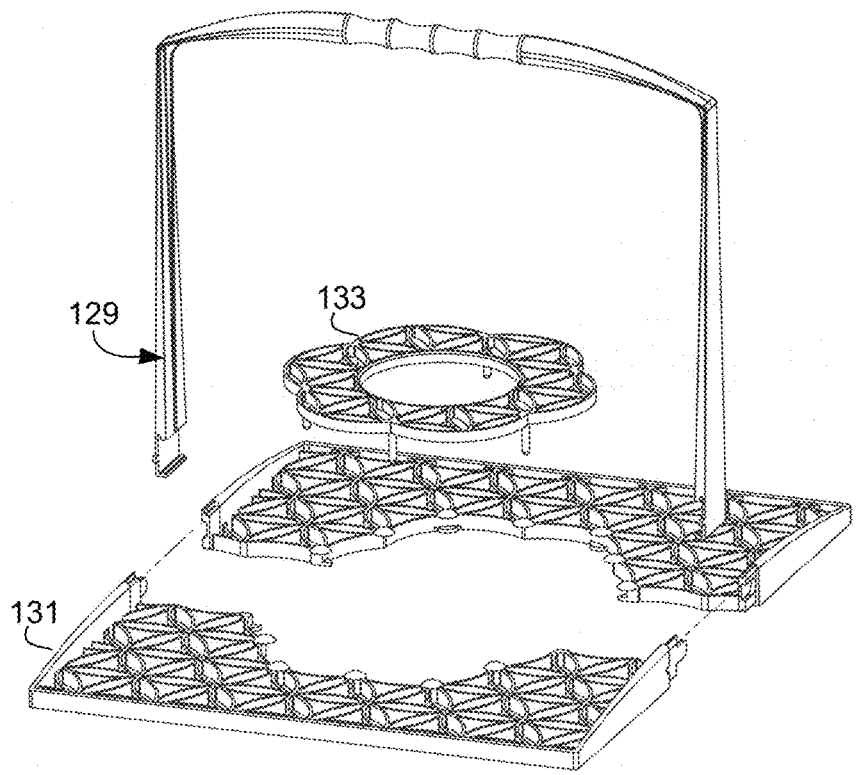
FIG. 7 is an exploded view of the tray assembly of FIG. 6.
Figure 8:
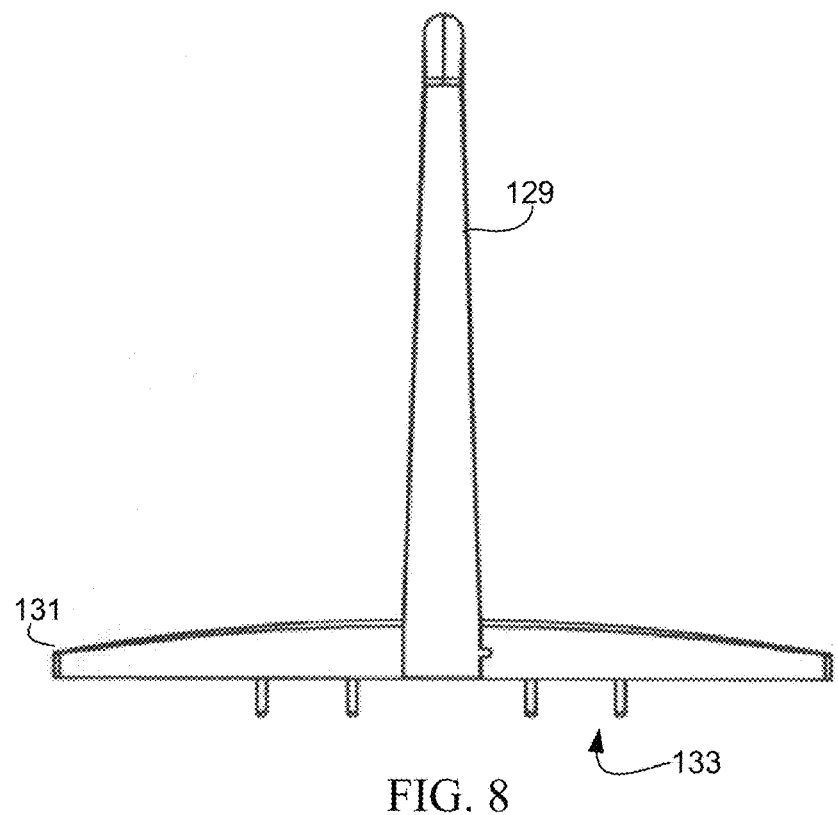
FIGS. 8-9 are side and front views of the tray assembly of FIG. 6.
Figure 9:
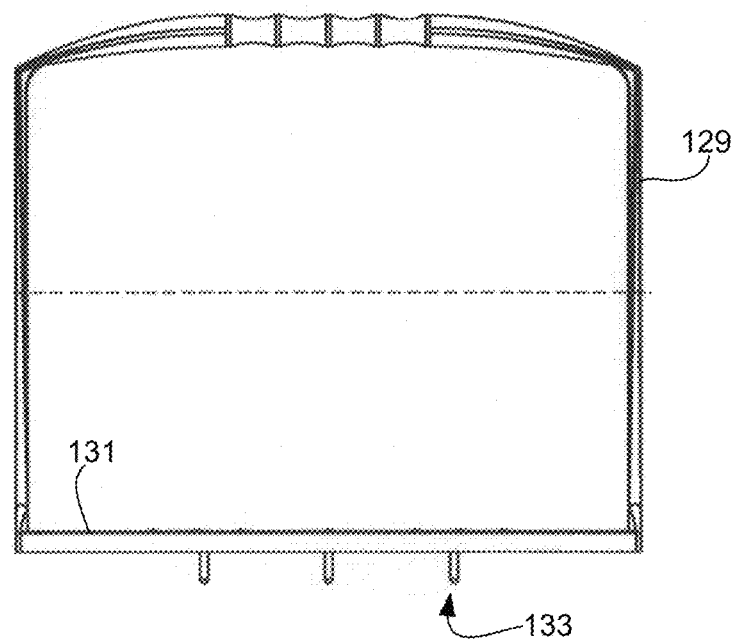

Referring now also to FIGS. 6-9 in the drawings, assorted views of tray 105 are illustrated. Tray 105 includes a handle portion 129, a base portion 131 and a center portion 133. Center portion 133 is configured to immediately surround floral arrangement 111. Center portion 133 locates and stabilizes floral arrangement 111 so as to prevent undesired rotation or tipping. Base portion 131 is configured to locate center portion within the center of the central volume of container 103. Base portion extends between panels 113 and contact ridge 119. Base portion 131 is prevented from shifting laterally from panels 113. Ridge 119 prevent base portion 131 from falling toward base 117. Handle 129 extends from base portion 131 and is configured to serve as a handle for the transportation of base portion 131 and center portion 133 (including floral arrangement 111), as well as being sized so as to rest along a lower surface of lid 115. Positioning along the lower surface of lid 115 when container 103 is closed serves to restrict movement of tray 105 in an upward direction toward lid 115. Tray 105 is fully stabilized within container 103. It is understood that tray 105 may be used as a transportation device outside of container 103 wherein a user merely grabs handle portion 129 to carry floral arrangement 111. FIGS. 8 and 9 are side and front views, respectively, of tray 105 as seen in FIG. 6.

Figure 11:
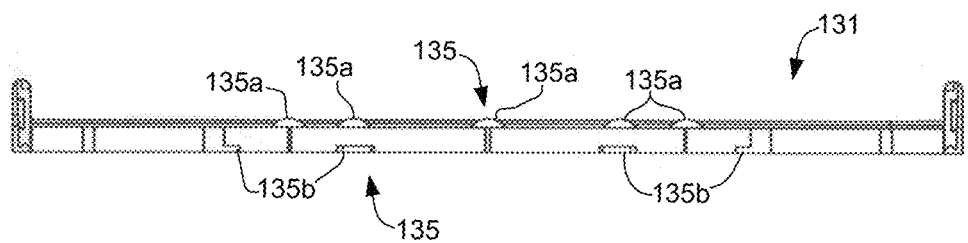
FIG. 11 is a side view of the base portion of FIG. 10.
Figure 10:
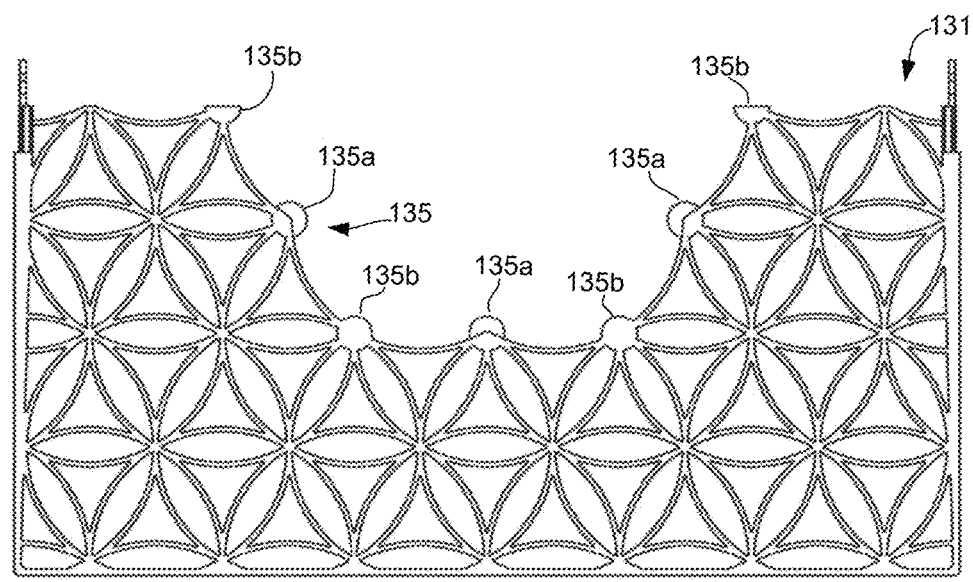
FIG. 10 is a bottom view of a base portion of the tray assembly of FIG. 6.

Referring now also to FIGS. 10 and 11 in the drawings, respective views of a portion of base portion 131 are illustrated. FIG. 10 is a bottom view of one half of base portion 131 while FIG. 11 is a side view facing inward to the space used to locate center portion 133. Base portion 131 is configured to couple to handle portion 129 along opposing sides. Furthermore, base portion is configured to selectively secure center portion 133 within a predefined area. By separating base portion 131, center portion 133 is removed. Center portion is held in place by base portion 131 through the use tabs 135. Tabs 135 are located around the internal diameter of the space designated for center portion 133. Tabs 135 may be located along an upper surface (tabs 135a) or along a lower surface (tabs 135b) of base portion 131. Center portion 133 is located between tabs 135a and 135b.

Figure 12:
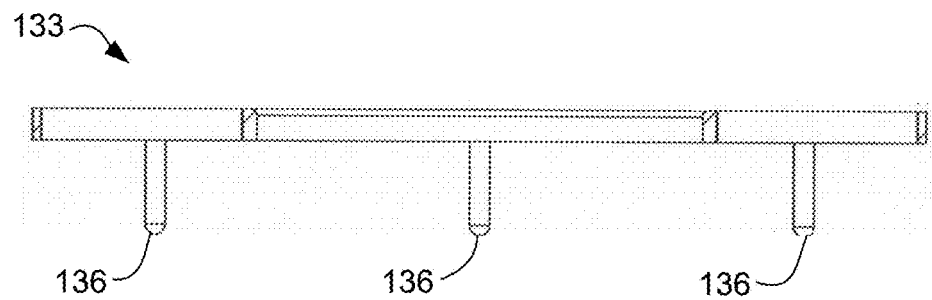
FIG. 12 is a side view of a center portion of the tray assembly of FIG. 6.
Figure 13:
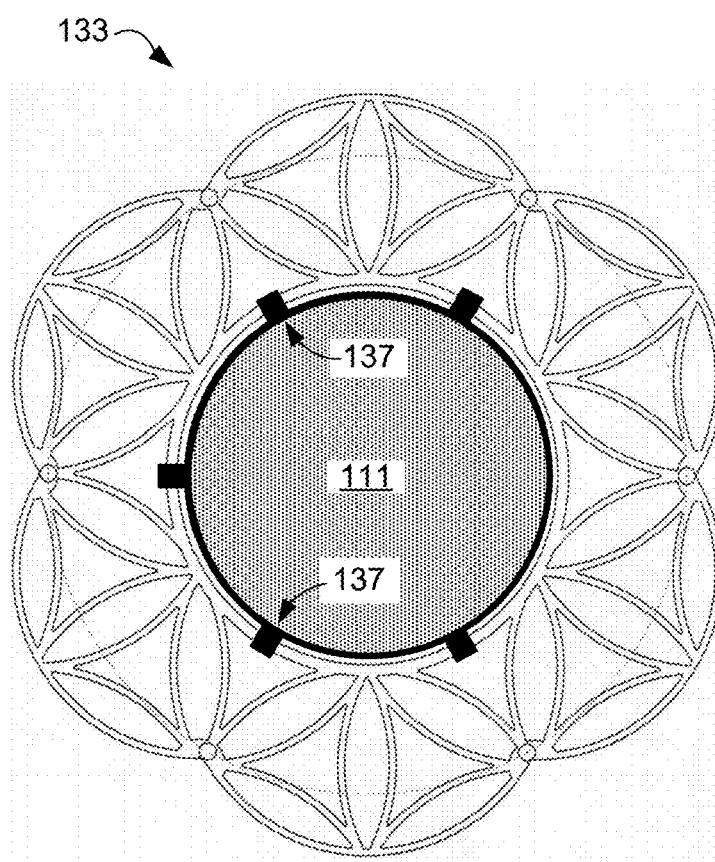
FIG. 13 is a top view of the center portion of the tray assembly of FIG. 6.
Figure 14:
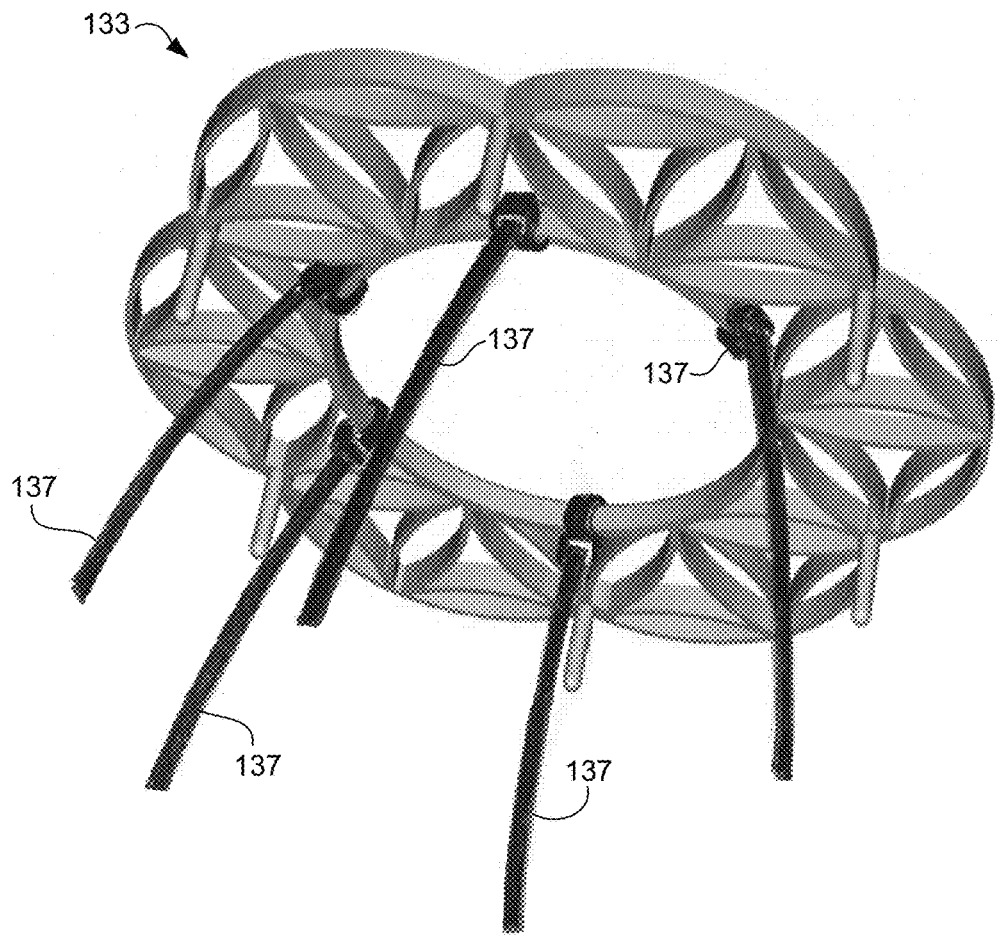
FIG. 14 is a lower perspective view of the center portion of FIG. 13.

Referring now also to FIGS. 12-14 in the drawings, assorted views of center portion 133 are illustrated. FIG. 12 is a side view of center portion 133. Center portion 133 includes a stem member 136 extending down from its main body. Member 136 are configured to provide lateral support when floral arrangement 111 is located in an arrangement holding container, such as base 107 or any other vase. Members 136 are configured to pass within the opening of the holding container so as to prevent leaning or tipping of arrangement 111. If arrangement 111 moves or begins to tip, member 136 will contact an internal surface or brim of the holding container and stop the relative motion. Therefore arrangement 111 maintains a relatively vertical alignment in the holding container.

FIG. 13 is a top view of center portion 133 as seen in FIG. 12 except that FIG. 13 includes a representative area for illustrating floral arrangement 111. Center portion 133 includes a central opening for the passage of floral arrangement 111. As discussed above, it is important to keep floral arrangement 111 stabilized during transportation to avoid damage to the flowers or undesired shifting within the holding container. Center portion 133 is configured to surround arrangement 111 and provide means of safely coupling itself to the arrangement. Arrangement 111 is assembled in a particular order and is held together via a wrapping member 138 (see FIG. 2). This ensures that the arrangement stays as desired. In order to couple floral arrangement 111 to center portion 133, a tying device 137 is used. Device 137 is coupled around a portion of center portion 133 and are configured to be wrapped with the stems of the floral arrangement by wrapping member 138. FIG. 13 illustrates tying devices 137 coupled around center portion 133. FIG. 14 is a lower perspective view of FIG. 13 wherein the floral arrangement 111 is removed for clarity so as to view tying devices 137. As seen in FIG. 14, devices 137 extend down from center portion 133 and are configured to rest along the stems of floral arrangement 111. When wrapped, arrangement 111 is fully suspended and secured to center portion 133. It is understood that the particular design of center portion 133 is not limited herein to this design. It only is necessary to have a location for the attachment of tying devices 137. Additionally, the location of tying device 137 on the stems of arrangement 111 can be selected so as to ensure that the stems will be suspended within container 103.

It is understood from the Figures that center portion 133 is configured to be removable from base portion 131. This allows for center portion 133 to be removed and placed around floral arrangement 111 outside of the rest of tray 105. Once properly organized, arrangement 111 and center portion 133 may be located in base portion 131. Handle portion 129 can then be used to carry arrangement 111. In general, center portion 133 may remain around arrangement 111 both pre and post transportation. For example, a receiver may elect to keep center portion 133 around arrangement 111 after removal from container 103. Also, the securing of devices 137 by wrapping member 138 may be performed when center portion 133 is either detached from base portion 131 or coupled to it.

It is understood that tray 105 may include any style of ornamentation and/or patterning of design. It is not limited to the design depicted. Additionally, center portion 133 is configured to seat within base portion 131. It may be seated by any known methods including interference fit. Also, handle portion 129 is detachable from base portion 131. A benefit of tray assembly 105 is that handle portion 129 may be used to carry arrangement 111 when the assembly is fully assembled. Alternatively, arrangement 111 may be carried or displayed while retained within center portion 133. Furthermore, arrangement 111 may be detached from center portion 133 and still secured by wrapping member 138. The act of carrying and displaying arrangement 111 may be performed in many different ways.

Figure 15:
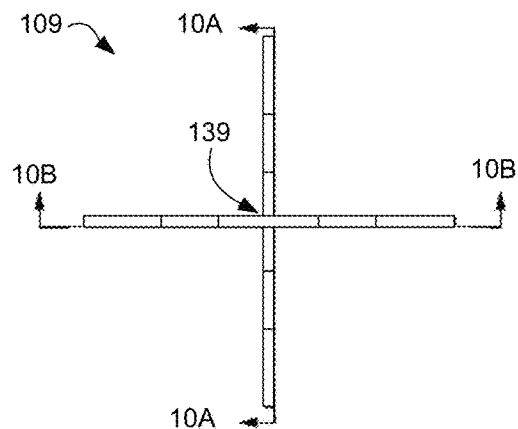
FIG. 15 is a top view of an insert in the floral packaging apparatus of FIG. 1.
Figure 16A:
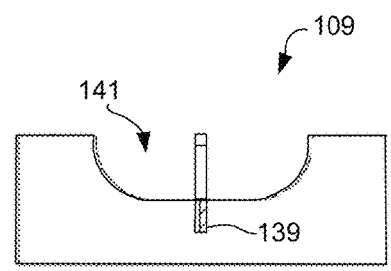
FIGS. 16A and 16B are respective side views of the insert of FIG. 8.
Figure 16B:
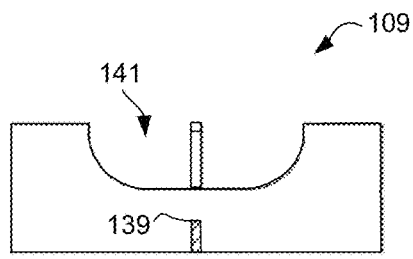

Referring now also to FIGS. 15-16B in the drawings, assorted views of insert 109 are illustrated. As stated previously, insert 109 is secured within container 103 and configured to cradle a portion of decorative base 107. Insert 109 may be made from a single or a plural number of different pieces selectively operating together. In FIGS. 9-10B, insert 109 is composed of two identical members. FIGS. 16A and 16B show respective side views of insert 109. Each member is slotted to form a half-lap joint 139. Together insert 109 forms a depression or cavity 141 configured to support decorative base 107. Base 107 is supported by insert 109 on four sides. Cavity 141 can be adjusted to fit any contour used with base 107.

It should be understood that the number of inserts, number of sides supported on base 107, and the associated number of grooves 123 and 125 are not herein meant to be limiting. More or less may be used so long as its purposes are maintained.

Decorative base 107 is meant to serve as a vase or container for holding floral arrangement 111. When shipped, floral arrangement 111 is provided with a container (i.e. base 107) to support and hold the flowers. A receiver of arrangement 111 need only remove arrangement 111 from tray 105 and insert it into decorative base 107. No removing of banding or straps are necessary. Arrangement 111 may be left in center portion 133 when inserted into base 107. Center portion 133 is sized to be larger than the opening of base 107 such that center portion 133 can rest on base 107 and suspend arrangement 111 within the water or liquid of base 107.

Referring again to FIG. 2 in the drawings, a temperature regulating device 143 is illustrated. Device 143 is configured to regulate the temperature within the central volume of container 103. As container 103 is shipped, it is subjected to various ambient profiles and temperature fluctuations. Apparatus 101 may optionally include one or more devices 143. Devices 143 are located along base 117 around insert 109. Device 143 may be a frozen material to remove heat from the central volume or may alternatively be a heat generating material(s) so as to introduce heat into the central volume. Locating devices 143 at this location isolates and restricts their movement away from floral arrangement 111. Spacing around base 107 and container 103 is preferably set such that device 143 is unable to pass. It should be mentioned that an advantage of base portion 129 having a design that allows air to pass through it is the ability to more adequately regulate airflow above and below base portion 131 when in container 103. If no air was permitted to pass, the air below base portion 131 may get too cold while the air above base portion 131 may remain too hot. The freshness of the flowers is maintained by ensuring proper flow of air.

The current application has many advantages over the prior art including at least the following: (1) a robust and secured way of transporting floral arrangements; (2) simple and quick to operate; (3) the suspending of a pre-made floral arrangement within a container; (4) ability to selectively detach the floral arrangement from various members of the packaging while remaining tied to a portion of the tray; and (5) temperature regulated capabilities.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A floral packaging apparatus for the transportation of a floral arrangement, comprising:
   a container defining a volume, the container having a plurality of sides;
   a tray configured to suspend the floral arrangement in an elevated position in a manner where the tray avoids direct contact with the floral arrangement;
   a decorative base configured to surround a portion of the floral arrangement;
   an insert in communication with the container and configured to cradle a portion of the decorative base;
   a plurality of tying devices in communication with the tray and extending inward to contact the floral arrangement; and
   a wrapping member configured to secure the plurality of tying devices to the floral arrangement so as to suspend the floral arrangement from the tray through the plurality of tying devices;
   wherein the tray, the decorative base, and the insert are disposed within the container.

2. The apparatus of claim 1, wherein the container includes a ridge formed along a quantity of the plurality of sides.

3. The apparatus of claim 2, wherein the tray contacts the ridge within the container.

4. The apparatus of claim 1, wherein the floral arrangement avoid contact with the decorative base.

5. The apparatus of claim 1, wherein the tray includes the following:
   a center portion configured to surround a portion of the floral arrangement;
   a base portion configured to locate the center portion; and
   a handle portion in communication with the base portion;
   wherein the center portion is detachable from the base portion.

6. The apparatus of claim 5, wherein the center portion surrounds the portion of the floral arrangement so as to stabilize the floral arrangement within the tray and the decorative base while eliminating direct contact with the container.

7. The apparatus of claim 1, wherein the insert is located relative to the container through one or more grooves within a base surface of the container.

8. The apparatus of claim 1, further comprising:
   a temperature regulating device configured to regulate the temperature within the container.

9. The apparatus of claim 8, wherein the temperature regulating device is a frozen material.

* * * * *